United States Patent [19]

Gardes

[11] 4,410,425

[45] Oct. 18, 1983

[54] FLOW LINE FILTER APPARATUS

[76] Inventor: Robert A. Gardes, 229 Smith Reed Rd., Lafayette, La. 70507

[21] Appl. No.: 290,376

[22] Filed: Aug. 5, 1981

Related U.S. Application Data

[63] Continuation-in-part of Ser. No. 270,573, Jun. 4, 1981, abandoned.

[51] Int. Cl.³ ............................................. B01D 23/02
[52] U.S. Cl. .................................... 210/167; 175/206; 209/259; 209/274; 210/170; 210/316; 210/449; 210/460
[58] Field of Search ............... 209/259, 268, 273, 274, 209/281, 350, 352, 393, 395; 175/206; 210/167, 170, 314, 316, 335, 435, 437, 439, 449, 455, 457, 460, 474

[56] References Cited

U.S. PATENT DOCUMENTS

| | | | |
|---|---|---|---|
| 1,405,873 | 2/1922 | Sellin | 210/438 |
| 3,789,992 | 2/1974 | Treplin et al. | 210/435 |
| 3,880,762 | 4/1975 | Wise | 210/460 |
| 4,098,698 | 7/1978 | Lamothe | 175/206 |
| 4,116,288 | 9/1978 | Love | 175/66 |

FOREIGN PATENT DOCUMENTS

| | | | |
|---|---|---|---|
| 467270 | 10/1928 | Fed. Rep. of Germany | 210/460 |
| 1420011 | 1/1976 | United Kingdom | 210/170 |

*Primary Examiner*—Peter A. Hruskoci
*Attorney, Agent, or Firm*—Bode & Smith

[57] ABSTRACT

An apparatus for filtering drilling mud that is being recirculated out of the drill hole, which substantially comprises the flow conveying tubular section having at its first end a flanged base portion sealably attachable to the top portion of the hydril and open-ended at its second end for allowing fluid flow therethrough. Also provided is an outer tank portion encapsulating substantially the upper half portion of said tubular section, the tank portion having an open-ended top portion for receiving flow out of the end portion of the flow conveying tubular section and integrally attached at its bottom portion to the outer surface of the flow conveying tubular section, the outer tank portion defining a container for receiving the flow from the tubular section. There is a first filter means interconnecting the top portion of the tubular section and the top portion of the tank section, the filter means comprising a plurality of angulated vanes equally and circumferentially mounted between the tank section and the tube section and defining an angulated filtering surface therebetween, and secondary filter means comprising a plurality of slots through the wall of that portion of the tubular section within the tank portion, for conveying fluid out of the tubular member into the tank portion, and a fluid conveying means for conveying fluid out of the tank section to be recirculated down the drill hole.

7 Claims, 6 Drawing Figures

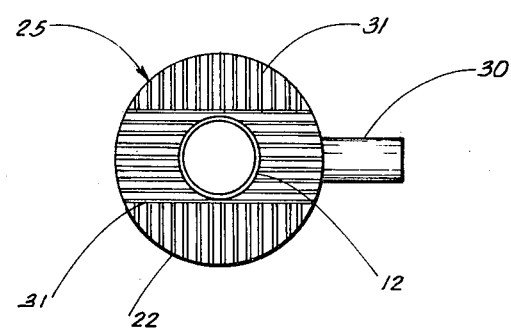
FIG. 4
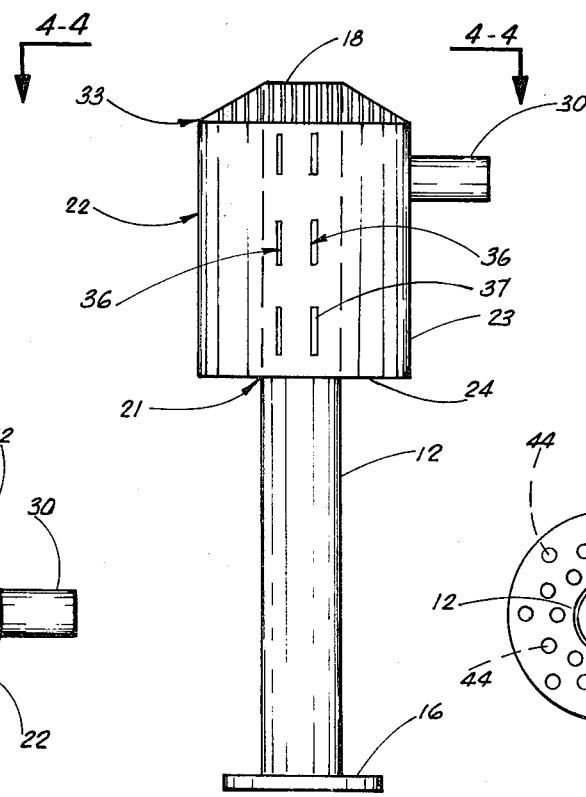
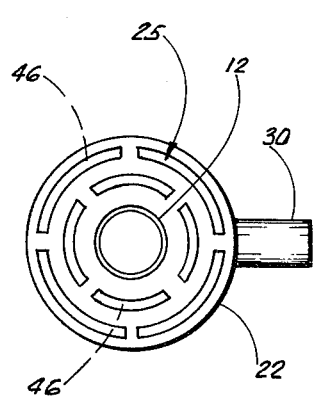
FIG. 6
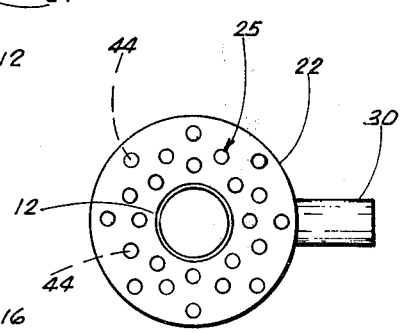
FIG. 5
FIG. 3

FLOW LINE FILTER APPARATUS

This is a continuation-in-part of my patent application entitled "Drilling Mud Filter Apparatus" filed on June 4, 1981, and bearing Ser. No. 270,573 now abandoned.

BACKGROUND OF THE INVENTION

1. Field of the Invention

The present invention relates to off-shore drilling equipment. More particularly, the present invention relates to a device for filtering the drilling mud and cuttings that are brought to the well head to be recirculated through a flow line.

2. General Background

During the drilling process and the production of off-shore oil and gas wells, cuttings and other debris from the drill bit down within the drill hole are brought up to the surface by means of pumping drilling mud under pressure down the drill pipe, into the drill hole, and circulating the mud along with the cuttings and other materials back to the surface through the exterior casing. Upon reaching the surface of the drilled hole, the mud, cuttings and other material are routed up the casing through the well head into a flow line which angularly allows the mud to flow away from the drilling site to be separated from the cuttings in separators and recirculated under pressure back down into the holes for use once more.

One of the most troublesome problems one confronts in this operation is the constant coagulation of mud and cuttings within the flow line and the ultimte blockage of the flow of mud and cuttings therethrough. When, in fact, the flow line becomes blocked, the flow of mud through this line is interupted. Therefore, the mud and materials, rather than routed through the flow line, are forced up to the surface, on the drill floor, which results often times in the loss of quantities of valuable drilling mud which is expensive and time consuming to replace and replenish. Also, the line must be unclogged which creates down time in the operation of the rig, consequently a loss of valuable revenues.

There is no apparatus which is being used by the off-shore industry, which is known to this inventor, which could prevent the coagulation of mud through the flow-line without interrupting the flow of mud therethrough.

Several apparatuses have been patented which attempt to serve as a filter for the cuttings from a well. They are as follows:

U.S. Pat. No. 3,880,762 issued to Roger Wise entitled "Separator for Cuttings" teaches a separator for drill bit cuttings being disposed on the top of a well pipe having a container surrounding the pipe in a slide area on the top of the container, the slide area being comprised of a plurality of spaced, elongated elements inclined downwardly from the top of the pipe sleeve. This particular patent addresses the problem of filtering out cuttings which may collect and clog the shaker screen. This particular apparatus would, in affect, have to have a filter screen which would filter cuttings of a very minute size so as not to clog the shale shaker screen and, for our purposes, would be ineffectual and inoperative.

U.S. Pat. No. 4,116,288 issued to William W. Love, entitled "Method and Apparatus for Continuously Separating Lost Circulating Material From Drilling Fluid" would teach the use of the method and apparatus for processing drilling mud. The lost circulating material is retained on a coarse screen while the mud and drilling solids pass through a finer mesh screen. This particular apparatus is a rather involved separator apparatus and would not suit the particular needs of this invention.

Other patents which are presently in the art are U.S. Pat. No. 3,774,702 issued to Wayland Elenburg entitled "Formation Chip Sampling Method," U.S. Pat. No. 2,169,675 issued to G. S. Bays entitled "Back Pressure Control in Pressure Drilling," U.S. Pat. No. 2,514,585 issued to M. L. Natland entitled "Method for Drilling Wells" and U.S. Pat. No. 2,870,990 issued to T. G. Bergey entitled "Drilling Fluid Method" are all directed toward cleaning drilling mud and recirculating it, but each of these particular apparatuses do not serve to meet the needs of this particular invention.

SUMMARY OF THE PRESENT INVENTION

The preferred embodiment of the apparatus of the present invention solves the problem as outlined in the previous section in a straightforward and simple matter. What is provided is a sub-unit which is fixedly attachable to the top portion of the hydril, for example, to receive the flow of mud and cuttings from within the hole as it is pumped upward. The apparatus contains a flow conveying tubular section which is sealably attachable at its lower end to the hydril and open ended at its upper end for allowing fluid flow therethrough. Provided along the wall of the flow conveying tubular section is a plurality of slotted openings circumferentially spaced around the upper portion of the tubular section for being the primary filter means for filtering the cuttings from the well hole. Encasing that portion of the tubular section containing the slotted openings is an outer tank portion, which comprises a floor section sealably and integrally attached to the outer circumferential wall of the tubular section and having a wall portion defining an enclosure tank, with the tank having an upper, open-ended fluid conveying tube or flow line angularly extending out of and away from its upper side wall. The upper end of the tank portion is fixedly connected to the upper end of the tubular portion via a secondary filtering means, which could be a grading, or a circular plate having a series of slotted openings or perforations therethrough.

In the utilization of the appartus, the drilling mud and other materials would flow upward through the well head would flow through the tubular portion which is connected to the hydril, and that major portion of the flow would filter out through the slotted openings in the wall of the tubular portion and into the tank portion and be conveyed out of the flow line. Those very large cuttings and debris which would not filter out of the primary filter means or slotted openings, would flow through the top of the tubular portion and, being unable to filter back through the top plate portion would slide off of the top portion and would be disallowed from flowing into the flow line. The grading or perforations in the top plate portion would allow liquid or other small cuttings which had travelled up through the section with the larger cuttings and debree would be allowed to reenter the tank portion for flow conveying into the flow line, while the larger debris and cuttings would be unable to reenter the tank portion and simply fall to the side, thus preventing clogging of the flow line by these objects.

Therefore, it is an object of the present invention to provide an apparatus for filtering down hole drilling mud between the well hole and the flow line;

The further object of the present invention is to provide a primary filtering means for disallowing certain size chunks of debris and cuttings from flowing into the flow line;

it is still a further object of the present invention to provide a secondary filter means for allowing reentry of smaller particles into the flow line and disallowing large debris from reentry;

it is a further object of the present invention to provide an apparatus, attached to the hydril, wherein the liquid and other smaller particles of debris reentering the flow line are maintained in a turbulant state for reentry into the flow line.

BRIEF DESCRIPTION OF THE DRAWINGS

For a further understanding of the nature and object of the present invention, reference should be had to the following detailed description, taken in conjunction with the accompanying drawings in which like parts are given like reference numerals and where:

FIG. 3 is a side view of the preferred embodiment of the apparatus of the present invention, illustrating in phantom the primary filter means;

FIG. 4 is a top view of the preferred embodiment of the apparatus of the present invention illustrating the secondary sieve means; and FIGS. 5 and 6 are top views of alternative embodiments of the secondary sieve means of the apparatus of the present invention.

DETAILED DESCRIPTION OF THE PREFERRED EMBODIMENT

Figure 1:
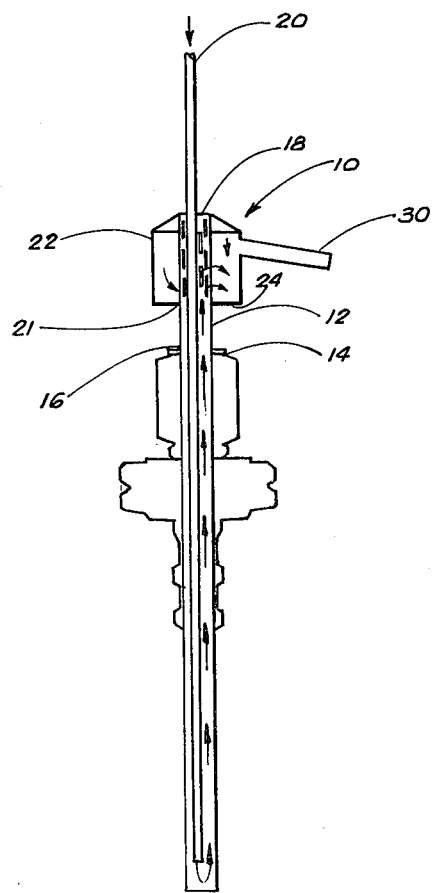
FIG. 1 illustrates an overall side view of the preferred embodiment of the apparatus of the present invention as attached to the well head.

FIGS. 1 through 4 illustrate the preferred embodiment of the apparatus of the present invention generally designated by Numeral 10. In the preferred embodiment, apparatus 10 would generally comprise an elongated tubular portion 12, which would connect, preferably to the top portion of a hydril 14 as seen in FIG. 1. In the preferred embodiment, the connection between apparatus 10 and hydril 14 would be a series of bolts 15 securely attached on to the flange base portion 16 of apparatus 10 to create a seal between apparatus 10 and hydril 14. Tubular portion 12 would be open ended at its upper end 18, and would allow fluid flow therethrough being a fluid flow conveying section. As further illustrated in FIGS. 1 and 2, a drill pipe 20 is illustrated as running down the center of tubular portion 12, wherethrough drilling mud and other materials are pumped under pressure down the drill hole. Preferably, the diameter of a average well casing, that being 20 inches in diameter, and the diameter of the drill pipe would be in the neighborhood of 6 inches, therefore allowing adequate space between the drill pipe 20 and the tubular portion 12 for accommodating the flow of drilling mud out of the drill hole as it is pumped through during drilling operations. In the preferred embodiment, apparatus 10 is located between the well head deck and the drill floor.

Figure 2:
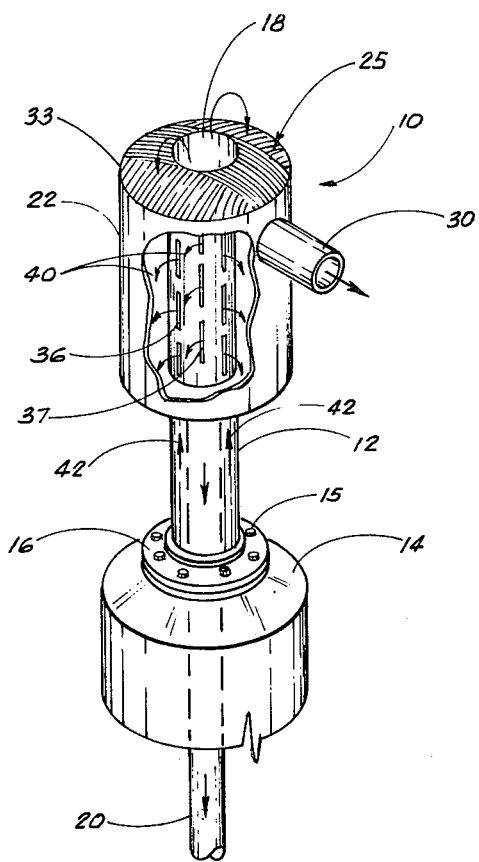
FIG. 2 is a perspective partially cut-away view of the preferred embodiment of the apparatus of the present invention.

In the preferred embodiment, tubular portion 12 would be enveloped near its upper most end by tank portion 22. Tank portion 22 would, in the preferred embodiment, as illustrated in FIGS. 2 and 3, would extend from a point slightly below the upper most end of tubular portion 12 down to a point 21 approximately half way down the length of tubular portion 12. In the preferred embodiment, tank portion 22 would be circular although it could be various other shapes, and would be sealably connected onto tubular portion 12 via a bottom plate portion 24 integrally attached to the wall 23 of tank portion 22 and circumferentially connected onto the exterior wall of tubular portion 12, thus forming a tank incapsulating substantially the upper half of tubular portion 12. Extending outward from the upper most portion of wall 23 of tank portion 22 would be fluid conveying tube 30, which would convey fluid from within tank portion 22 out of tank 22, being angulated downward and away from tank portion 22, as seen in FIGS. 1 and 3.

In the preferred embodiment, tank portion 22 would be fixedly attached to the upper end of tubular portion 12 via a grading 31 which would define a secondary filter or sieve means 25 between tubular portion 12 and the wall 23 of tank portion 22, as seen in FIGS. 3 and 4.

In the preferred embodiment, as further illustrated in FIGS. 2 and 3, the upper end portion 18 of tubular portion 12 is slightly higher than the upper end 33 of tank portion 22, so that the strain or sieve means 25 as defined by the grating 31, would define an angulated surface descending away from tubular portion 12, preferably at a 20 to 30 degree angle.

In the preferred embodiment, this secondary, angulated sieve means 25 would, while allowing fluid and small particles and debris to filter or strain through grading 31, would disallow debris or the like of substantial size to slide off of grading 31 and thus prevent the return of said material back into the tank portion 22 and thus further disallow clogging of flow line 30.

In the preferred embodiment, that portion of tubular portion 12 which extends from the floor 24 of tank portion 22 up through the top end of tank 22 would provide the primary filtering means 36 comrising a plurality of slotted vents or cuts 37 circumferentially spaced around the wall of tubular portion 12 for conveying fluid from within tubular portion 12 into tank 22 as fluid moves up tubular portion 12 as indicated by arrows 42 in FIG. 2. In the preferred embodiment, these slotted vents 37 would be preferably one foot in length by one inch in width and would be spaced approximately 2 inches apart. They would be set up in four rows along the length of that section of tubular portion 12 as previously defined.

In the preferred embodiment, slots 37, which comprise the primary filter means 36, would serve to capture the major portion of the mixture of fluid and mud as it moves upward through tubular portion 12 into tank portion 22 of apparatus 10 as indicated by arrows 40 in FIG. 2. That portion, during the process, the flow of the admixture as indicated by arrows 40, would continuously create a turbulated state of admixture within tank portion 22. That admixture in tank 22 would fill tank 22 until the level of fluid would reach the flow conveying tube 30 at which point the admixture would be directed outward up tank 22 in flow 30 into shakers for further filtering. It is crucial in the process that the admixture maintain itself in the turbulated state, so that the particles of mud would not have a tendency to settle on the bottom of tank 22 and would be further broken into smaller particles as the admixture was maintained in the turbulated state within tank portion 22. Thus, the primary filter means 36 would allow the greater amount of the admixture to filter therethrough for conveying into flow line 30, without having to spill out of the open ended end 18 of tubular portion 12.

Consequently, that material in the admixture which is of such size that it could not sieve through slots 37, for example, chunks of mud, solid debris from the drill hole, etc., would be conveyed out of the top end portion 18 of tubular portion 12 to incur sieve means 25 which is comprised of the grading 31, in the preferred embodiment. That portion of the admixture which would then be of such a size to be strained through grading 31 would be allowed to do so and would then be reemptied into tank portion 22 and out of flow line 30, and that material in the admixture which would be too large to sieve between grading 31 would simply incur grading 31 as the secondary filter means 25 and, because of the angulated position of grading 31 (in the preferred embodiment 20° to 30° of the horizontal) would simply slide off of apparatus 10 onto the drill floor or into the water to be swept or carried away at a later time.

Of course, that material which would have sieved back through grading 25 and into tank 22 would be reconveyed by flow tube 30 for engagement with the mud shakers and recirculation back down into the mud hole. It is through this process of filtering of the mud out of the mud hole that the apparatus would allow the flow line 30 to maintain substantially unblocked by large chunks of mud and debris which, in the present state of the art, tend to plague that portion of oil production at this time.

FIG. 4 illustrates a top view along lines 4—4 of FIG. 3 of apparatus 10. As seen in FIG. 4, grading 31 would be substantially positioned between the outer wall of tubular portion 12 and the outer wall of tank portion 22. Also illustrated in FIG. 4 is a top view of flow line 30, which angularly extends out of the upper portion of tank 22. This top view one can see the relative diameter of tank portion 22 in relation to the diameter of tube portion 12. In view of the fact that filter apparatus 10, is engaged to the top portion of hydril 14, it is easily removable by removing bolts 15 for cleaning or repair and can be replaced in a simple method for resuming production of oil or the like. In the preferred embodiment, the entire apparatus could be constructed of metal, and the grading 31 would be a common grading known in other art. In the preferred embodiment, the tank portion of the apparatus would be substantially 6 feet in length and 42 inches in width, with the inner tubular portion being essentially the same diameter as drill pipe, that being 20 inches and diameter.

FIGS. 5 and 6 illustrate a top view of alternative embodiments of the secondary filter means 25, which is illustrated in FIGS. 5 and 6 could be a solid plate angularly extending from the top portion of tubular portion 12 to the top portion of the wall of tank 22 and integrally attached thereto through welding or the like. This plate portion could be perforated with a plurality of ports 44 as seen in FIG. 5 for refiltering that portion of the admixture which has moved out of the top of tubular portion 12 for reconveyance into flow line 30, or, as seen in FIG. 6, secondary filter means 25 could be a plate having a series of slotted, curved openings 36 positioned around the entire circumference of plate 25 for filtering once more. It should be stressed that the primary filter means in the apparatus would be the primary filtering means 36 comprising the plurality of slotted vents or cuts 37, wherein most if not all of the fluid flowing up through tubular portion 12 would be initially filtered into tank portion 22.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for filtering drilling mud that is recirculated out of a well casing, comprising:
   a. a flow conveying tubular section, sealably attachable at its first lower end to the well casing for allowing fluid flow therethrough and open-ended at its top portion;
   b. an outer tank portion encapsulating said tubular section having a substantially open-ended top portion and defining a container for receiving fluid flow from said open-ended tubular section, and for maintaining turbulence in said filtered fluid;
   c. primary filter means on that portion of said tubular section housed within said tank portion comprising a plurality of vertical slotted vents equally and circumferencially spaced around the wall of said tubular section and in fluid communication with said tank portion for filtering fluid flow out of said tubular section into said tank portion, said tank portion being substantially twice the diameter of said tubular section;
   d. fluid conveying means for conveying filtered fluid out of said tank portion; and
   e. secondary filter means interconnecting the top of said tubular section to the top of said tank portion for filtering solids flowing out of the top of said tubular section and allowing filtered fluid to flow into said tank.

2. The apparatus in claim 1, wherein said secondary filter means comprises an angulated surface having a plurality of openings, said surface interconnecting with top portion of said tank portion to the top end of said tubular section.

3. The apparatus in claim 1, wherein the top end of said tank portion is slightly lower than the top end of said tubular section for providing an angulated and downwardly disposed surface defining said secondary filter means.

4. The apparatus in claim 1, wherein the diameter of said tubular portion is substantially equal to the diameter of said well casing.

5. An apparatus for filtering drilling mud that is recirculated out of a well casing, the apparatus comprising:
   a. a flow conveying tubular section having at its first end a flange base portion sealably attachable to a portion of the well casing between the wellhead deck and the drill floor and open-ended at its second end for allowing flow therethrough;
   b. an outer tank portion being at least twice the diameter of said flow conveying tubular section, encapsulating substantially the upper half portion of said tubular section, said tank portion being substantially open-ended at its top portion and attached at its bottom portion to the outer surface of said flow conveying tubular section, and defining a container for receiving said filtered flow from said tubular section;
   c. primary filter means comprising a plurality of vertical slotted vents equally and circumferentially spaced around the wall of that portion of said tubular section within said tank portion and in fluid communication therewith for conveying fluid out of said tubular section and into said tank portion as said fluid containing solids travels up said tubular portion;

d. secondary filter means interconnecting the top of said tubular section to the top of said tank portion, said secondary filter means comprising a plate having a plurality of ports, said plate mounted between said tank portion and said tubular section and defining an angulated filtering surface therebetween for filtering said solids flowing out of the top of said tubular section, yet allowing fluid to flow through said openings into said tank; and e. fluid conveying means extending from and in fluid communication with said tank portion for conveying filtered fluid out of said tank portion.

6. The apparatus in claim 5, wherein said tubular section is substantially the diameter of said well casing.

7. The apparatus in claim 5, wherein said angulated surface of said secondary filter means slopes downwardly at an angle between 20 to 30 degrees below the horizontal plane.

* * * * *